(12) United States Patent
Ishii

(10) Patent No.: US 9,785,864 B2
(45) Date of Patent: Oct. 10, 2017

(54) IMAGE PROCESSING METHOD, IMAGE PROCESSING APPARATUS, PROGRAM, AND RECORDING MEDIUM

(71) Applicant: CANON KABUSHIKI KAISHA, Tokyo (JP)

(72) Inventor: Masaki Ishii, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 273 days.

(21) Appl. No.: 14/793,491

(22) Filed: Jul. 7, 2015

(65) Prior Publication Data

US 2016/0012312 A1     Jan. 14, 2016

(30) Foreign Application Priority Data

Jul. 8, 2014    (JP) ................................. 2014-140257

(51) Int. Cl.
| | |
|---|---|
| *G06K 9/62* | (2006.01) |
| *G06K 9/46* | (2006.01) |
| *G06K 9/68* | (2006.01) |
| *G06T 7/13* | (2017.01) |

(52) U.S. Cl.
CPC ......... *G06K 9/6204* (2013.01); *G06K 9/4609* (2013.01); *G06K 9/6857* (2013.01); *G06T 7/13* (2017.01); *G06T 2207/20016* (2013.01)

(58) Field of Classification Search
None
See application file for complete search history.

(56) References Cited

U.S. PATENT DOCUMENTS 6,272,247 B1 * 8/2001 Manickam ........... G06K 9/6857
                                                          382/217
7,016,539 B1 * 3/2006 Silver ................... G06K 9/481
                                                          382/216

(Continued)

FOREIGN PATENT DOCUMENTS

JP     2007-257601 A    10/2007

OTHER PUBLICATIONS

Hirooka, Miwako, et al. "Hierarchical distributed template matching." Electronic Imaging'97. International Society for Optics and Photonics, 1997. 8 pages.*

(Continued)

*Primary Examiner* — Ryan P Potts
(74) *Attorney, Agent, or Firm* — Canon U.S.A., Inc. IP Division

(57) ABSTRACT

To improve a search accuracy in template matching based on a coarse-to-fine search method, a first pyramid is generated by hierarchizing a plurality of template images having different resolutions from each other in order of the resolution, a second pyramid is generated by hierarchizing a plurality of search target images having different resolutions from each other corresponding to the same resolutions as the template images in the first pyramid in order of the resolution, and a search process of searching for a feature image included in the template image of the first pyramid from the search target image in the second pyramid in a hierarchy of the same resolution. When the first pyramid is generated, the number of stages of the first pyramid is set such that a size of the feature image included in each of the template images is not smaller than a previously set threshold.

14 Claims, 16 Drawing Sheets

(56) References Cited

U.S. PATENT DOCUMENTS

| | | | |
|---|---|---|---|
| 2003/0086616 A1* | 5/2003 | Oh | G03F 9/7076 382/209 |
| 2004/0101199 A1* | 5/2004 | Lee | G06K 9/6203 382/209 |
| 2007/0217676 A1* | 9/2007 | Grauman | G06K 9/4671 382/170 |
| 2007/0223817 A1* | 9/2007 | Ulrich | G06K 9/6255 382/199 |
| 2008/0095448 A1* | 4/2008 | Ono | G06K 9/6857 382/209 |
| 2014/0270374 A1* | 9/2014 | Unzueta | G06K 9/00281 382/103 |

OTHER PUBLICATIONS

Gavrila, Dariu M. "Multi-feature hierarchical template matching using distance transforms." Pattern Recognition, 1998. Proceedings. Fourteenth International Conference on. vol. 1. IEEE, 1998. 6 pages.*

* cited by examiner

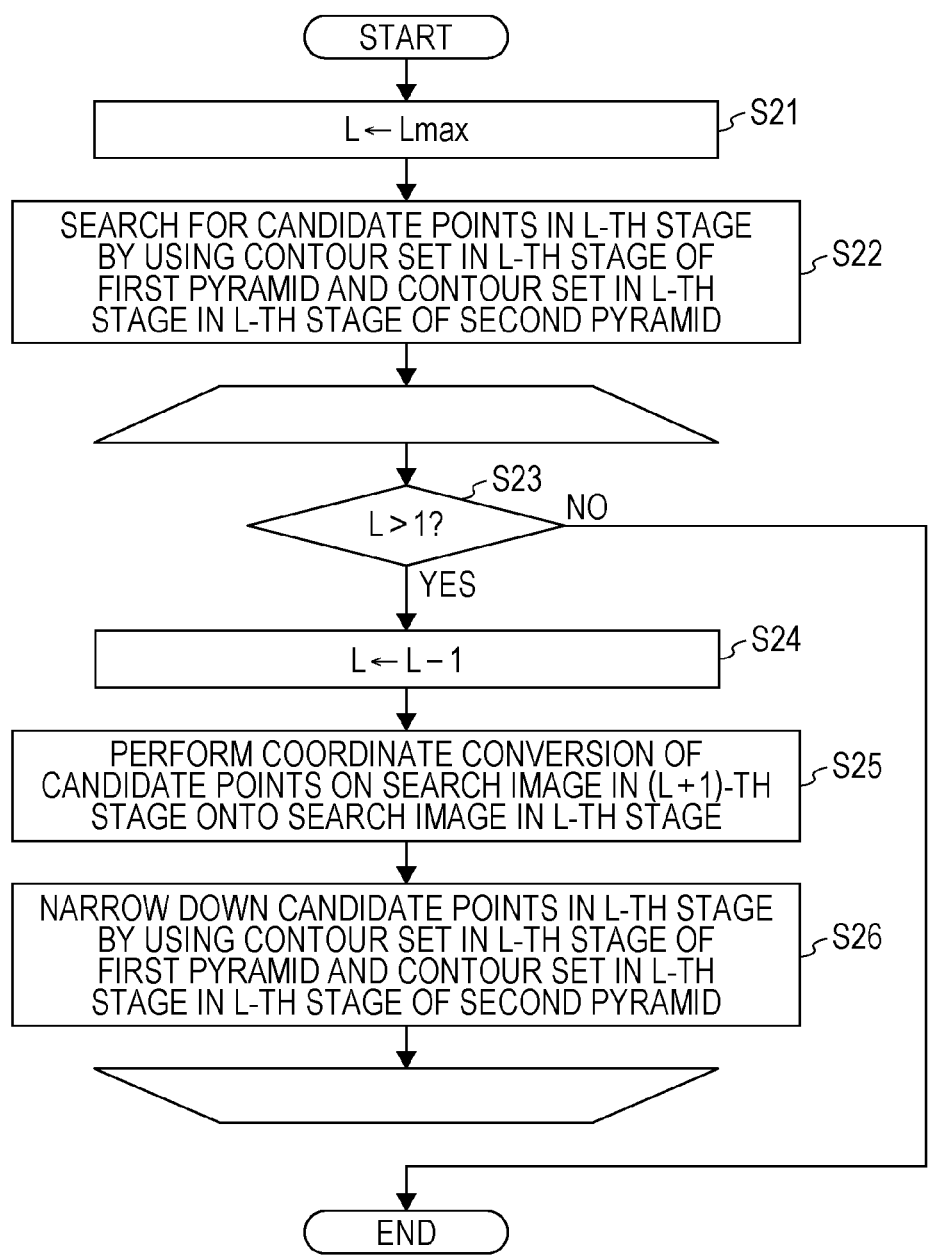

IMAGE PROCESSING METHOD, IMAGE PROCESSING APPARATUS, PROGRAM, AND RECORDING MEDIUM

BACKGROUND OF THE INVENTION

Field of the Invention

The present invention relates to an image processing method, an image processing apparatus, a program, and a recording medium, and the invention particularly relates to template matching in which a template image including a feature image such as contour information is used.

Description of the Related Art

Processing of finding an object from a picked-up image is one of functions often used in a machine vision. Template matching has been accordingly proposed as image processing for searching for a pattern from the pickup image in general. In the template matching, a feature of a pattern intended to be searched for is prepared as a template image in advance. In a case where the pattern is then searched for from the pickup image, the previously prepared template image is compared with a target image obtained by extracting the feature from the pickup image. Contour information is used in many cases as the feature included in the template image and the target image.

When a direct search for a high resolution image is performed, a problem occurs that it takes much processing time, and a coarse-to-fine search method has been proposed in general as a method for solving the problem. According to the coarse-to-fine search method, a course search is performed first by using a low resolution image, and a fine search is then performed by gradually increasing the resolution. A data structure called pyramid in which a plurality of images having different resolutions are hierarchized is used in the coarse-to-fine search method. This is the data structure in which a low resolution conversion of a pattern feature (for example, a contour) is repeatedly performed, and the pattern features having multiple resolutions are arranged in a layer structure.

The number of images having different resolutions are referred to as number of stages, or levels, of the pyramid. According to this data structure, the top stage of the pyramid is the pattern feature having the lowest resolution, and the resolution is increased as the pyramid stage is lowered. In the actual search, the search is started from the top stage of the pyramid, and the following processing is repeatedly performed in which a result (candidate point) that has been obtained by performing the search in a certain pyramid stage, is searched for at a higher accuracy in a next pyramid stage below.

A related art regarding the coarse-to-fine search method is disclosed, for example, in Japanese Patent Laid-Open No. 2007-257601. Japanese Patent Laid-Open No. 2007-257601 discloses a method of performing a highly accurate search by carrying out the search with use of a pyramid of a previously prepared template image and a pyramid generated from a search target image while the resolution is consecutively increased from the image having the low resolution in the pyramid.

However, according to the coarse-to-fine search method described above in Japanese Patent Laid-Open No. 2007-257601, the pyramid is generated with the previously determined number of stages irrespective of a size of the contour included in the template image. Therefore, the contour may collapse in the template image depending on a search target, and a noise image is generated in some cases. If the noise image is included in the template image, a correct answer may be missed in the search in an intermediate stage of the pyramid, and a search accuracy is degraded.

SUMMARY OF THE INVENTION

In view of the above, the present invention aims at improving the search accuracy in the template matching based on the coarse-to-fine search method.

An image processing method according to an aspect of the present invention is an image processing method of performing image processing by an image processing apparatus, the method including: a first process of generating a first pyramid by hierarchizing a plurality of template images having different resolutions from each other in order of the resolution; a second process of generating a second pyramid by hierarchizing a plurality of search target images having different resolutions from each other corresponding to the same resolutions of the template images in the first pyramid in order of the resolution; and a search process of performing search processing for searching for a feature image included in the template image in the first pyramid from the search target image in the second pyramid in a hierarchy of the same resolution, in which the first process includes setting a number of stages of the first pyramid in a manner that a size of the feature image included in each of the template images in the first pyramid is not smaller than a previously set threshold.

Further features of the present invention will become apparent from the following description of exemplary embodiments with reference to the attached drawings.

According to the aspect of the present invention, the search accuracy can be improved in the template matching based on the coarse-to-fine search method.

BRIEF DESCRIPTION OF THE DRAWINGS

FIG. 7 is a flow chart illustrating a search process of the image processing method according to the first exemplary embodiment of the present invention.

DESCRIPTION OF THE EMBODIMENTS

Hereinafter, exemplary embodiments for carrying out the present invention will be described in detail with reference to the drawings.

First Exemplary Embodiment

Figure 1:
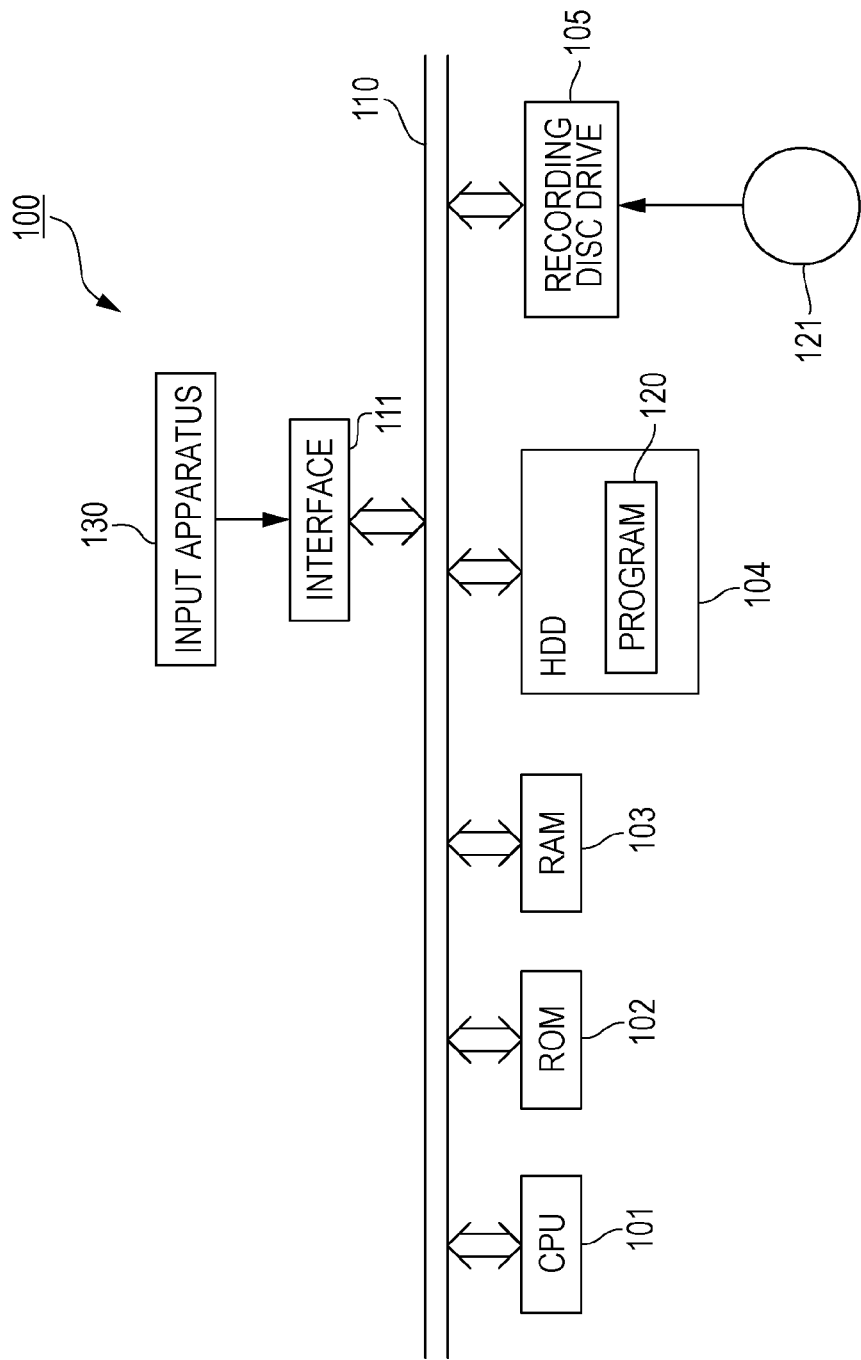
FIG. 1 is a block diagram illustrating a schematic configuration of an image processing apparatus according to a first exemplary embodiment of the present invention.

FIG. 1 is a block diagram illustrating a schematic configuration of an image processing apparatus according to a first exemplary embodiment of the present invention. As illustrated in FIG. 1, an image processing apparatus 100 is configured to perform image processing, specifically, template matching processing, and is constituted by a computer. The image processing apparatus 100 is provided with a central processing unit (CPU) 101 as a calculation unit (control unit). The image processing apparatus 100 is provided with a read only memory (ROM) 102, a random access memory (RAM) 103, and a hard disk drive (HDD) 104 as a storage unit. The image processing apparatus 100 is also provided with a recording disc drive 105 and various interfaces 111.

The ROM 102, the RAM 103, the HDD 104, the recording disc drive 105, and the interfaces 111 are connected to the CPU 101 via a bus 110. The ROM 102 stores an activation program such as BIOS. The RAM 103 is a storage apparatus that temporarily stores various data such as a calculation processing result of the CPU 101 and the like.

The HDD 104 stores (records) a program 120. While the CPU 101 reads out and executes the program 120, respective processes (a first process, a second process, and a search process) of an image processing method that will be described below are executed.

The recording disc drive 105 can read out various data, programs, and the like recorded in a recording disc 121. An input apparatus 130 such as a camera or an external storage apparatus that transmits image data is connected to the interfaces 111. Accordingly, the CPU 101 can receive the input of the image data from the input apparatus 130.

Next, descriptions will be given of a first process of generating a first pyramid by hierarchizing a plurality of template images having different resolutions from each other in order of the resolution in a case where a position of a pattern in a search target image is searched for by the coarse-to-fine search method. Each template image is an image obtained by applying an edge extraction filter to a pattern image corresponding to an original reference image.

Figure 2:
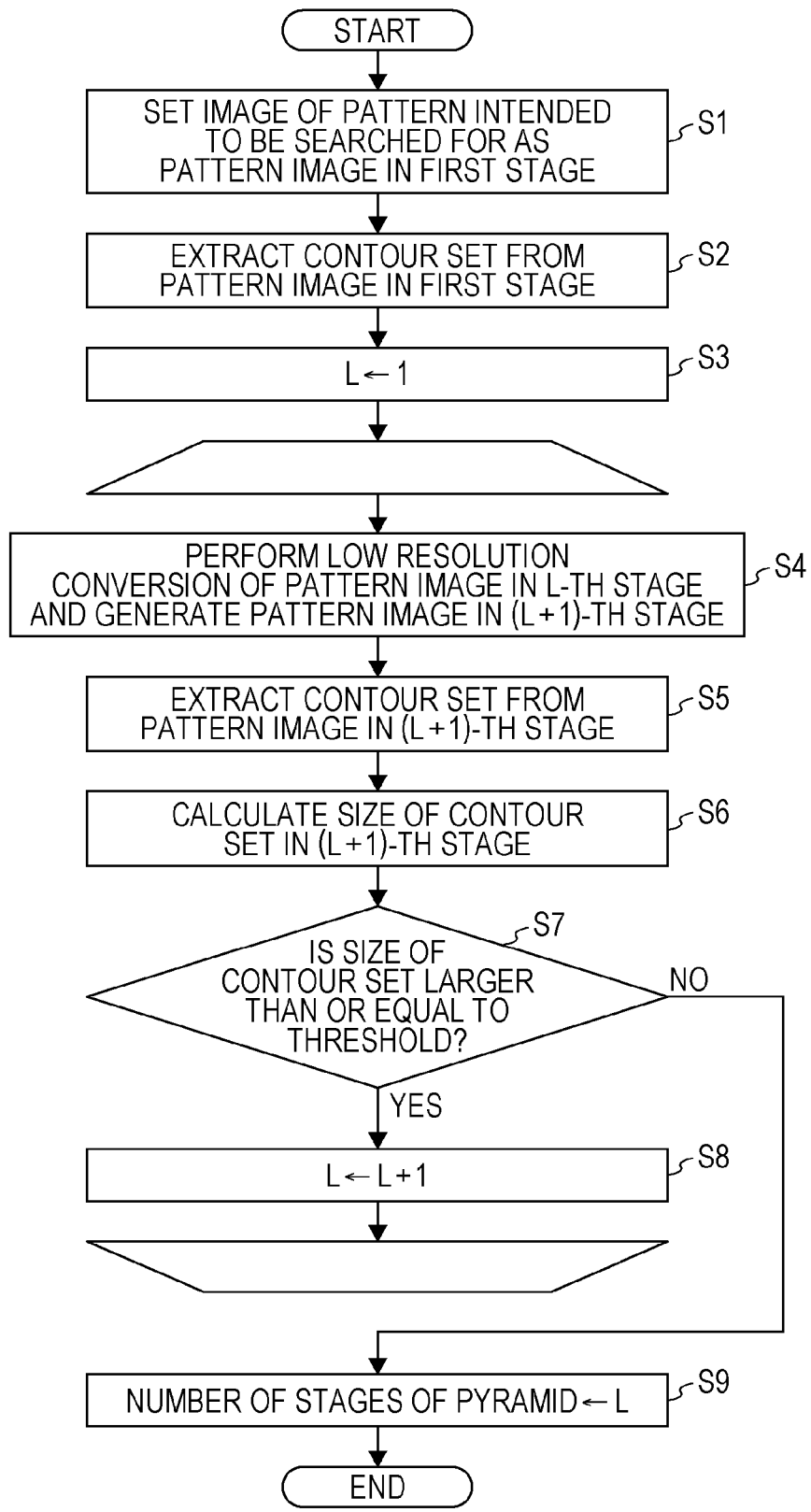
FIG. 2 is a flow chart illustrating a first process of an image processing method according to the first exemplary embodiment of the present invention.
Figure 3A:
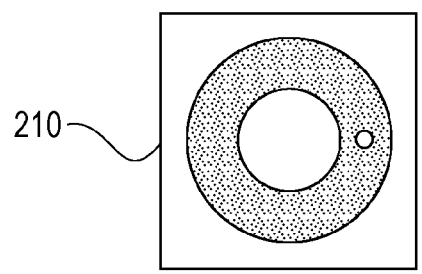
FIGS. 3A and 3B are explanatory diagrams for describing a first pyramid generated in the first process of the image processing method according to the first exemplary embodiment of the present invention.
Figure 3B:
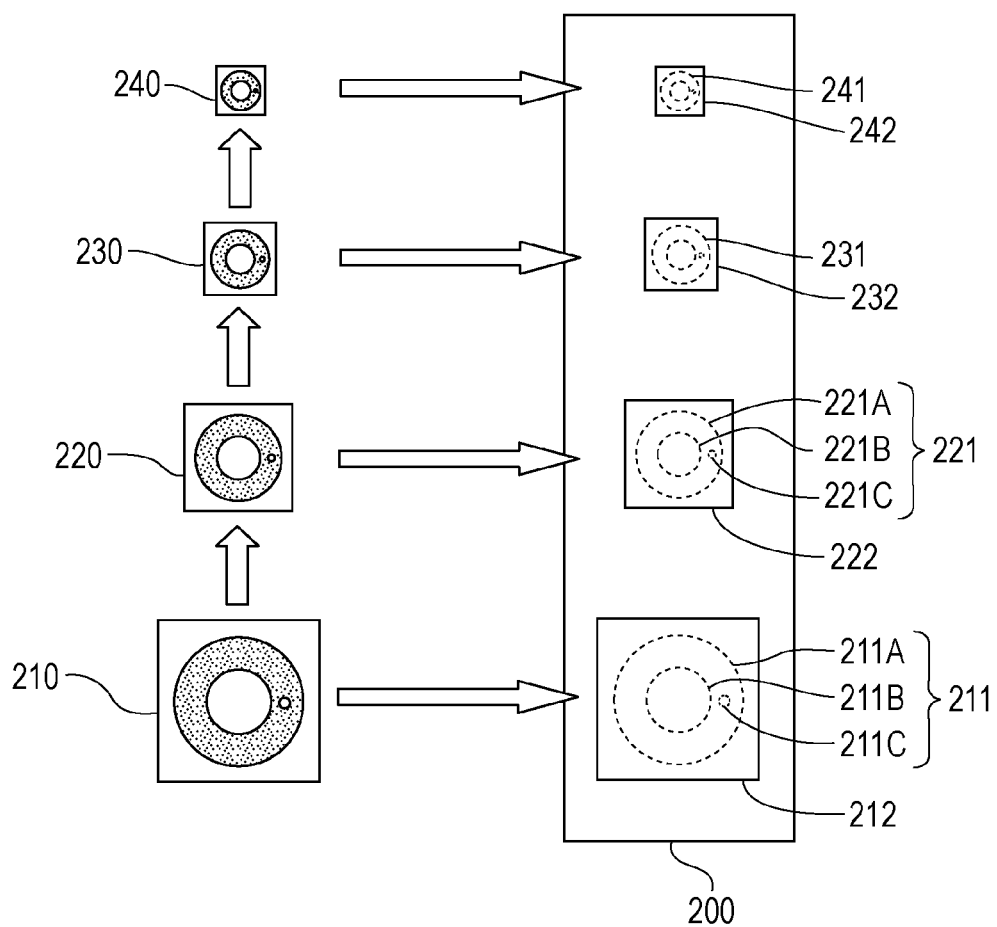

FIG. 2 is a flow chart illustrating the first process of the image processing method by the image processing apparatus according to the first exemplary embodiment of the present invention. FIGS. 3A and 3B are explanatory diagrams for describing the first pyramid generated in the first process. FIG. 3A illustrates a reference image (pattern image) corresponding to a picked-up image obtained by picking up an image of a gauge (pattern) of a work. FIG. 3B illustrates an example of the first pyramid generated from the pattern images. Hereinafter, descriptions will be given along the flow chart illustrated in FIG. 2.

The CPU 101 of the image processing apparatus 100 obtains the image in which the pattern intended to be searched for is picked up which is illustrated in FIG. 3A, from the input apparatus 130 and sets this image as a pattern image 210 in the first stage (S1).

Next, the CPU 101 applies an edge extraction filter such as a Sobel filter or a Canny filter to the pattern image 210 in the first stage of the pyramid and extracts a contour set 211 constituted by one or more contours as the feature image (S2). The CPU 101 then generates a template image candidate 212 including the image (feature image) of the contour set 211. That is, in step S2, the template image candidate 212 including the contour set 211 constituted by a plurality of the contours 211A, 211B, and 211C is obtained by applying the edge extraction filter to the pattern image 210. The CPU 101 sets the template image candidate 212 in a lowermost layer (bottom stage, first stage) of a first pyramid 200 as the template image 212.

Figure 4A:
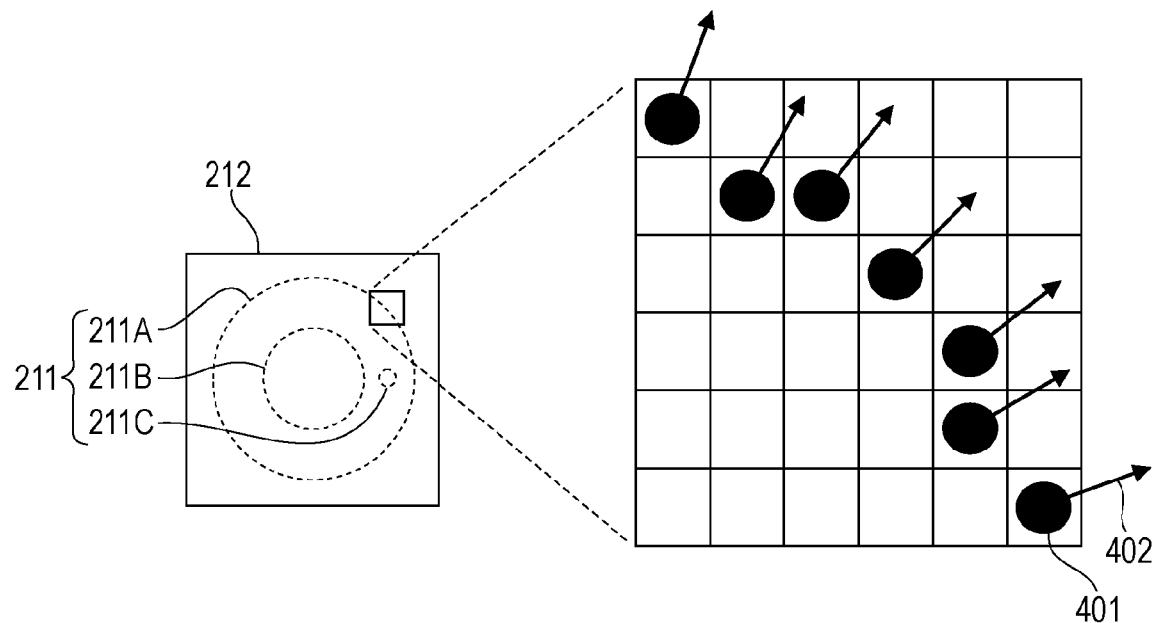
FIGS. 4A and 4B are explanatory diagrams for describing a template image generated in the first process of the image processing method according to the first exemplary embodiment of the present invention.
Figure 4B:
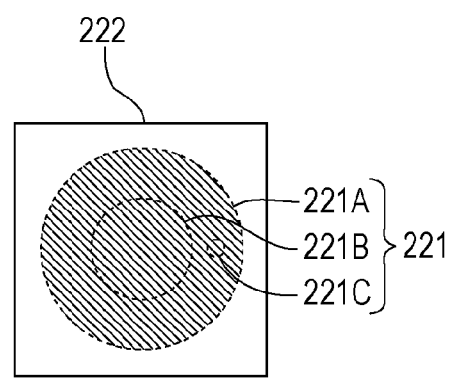

FIGS. 4A and 4B are explanatory diagrams for describing the template image. FIG. 4A illustrates an example of the contour set 211 constituted by the three contours including the contours 211A, 211B, and 211C. The respective contours 211A, 211B, and 211C are constituted by a plurality of edge points 401. The contour set 211 is represented in an image format, and a size of the template image 212, that is, a width and a height of the template image 212, is the same as that of the pattern image 210. An edge point 401 illustrated in FIG. 4A represents a pixel where an edge exists. The edge point 401 has information of a direction of the edge (direction of an arrow 402) and an intensity of the edge (length of the arrow 402).

Herein, the edge (contour) refers to a pixel at a border between a dark (dense) color and a bright (light) color in the image. The direction of the edge is a vertical direction with respect to the contour and a direction from the dark (dense) color towards the bright (light) color. The intensity of the edge is a steepness of a change from the dark (dense) color to the bright (light) color or the opposite color change.

Next, the CPU 101 initializes the index L of the pyramid stage to 1 (S3).

Next, the CPU 101 generates a pattern image in the (L+1)-th stage by performing a low resolution conversion of the pattern image in the L-th stage (S4).

For the low resolution conversion, the resolution is halved each time the pyramid stage is increased by 1 (L is increased by 1). When the resolution of the pattern image 210 in the first stage is set as R, as the pyramid stage is increased like the first stage, the second stage, the third stage, the fourth stage, . . . , then the resolutions of the pattern images in the respective pyramid stages are decreased like R, R/2, R/4, R/8, . . . . FIG. 3B illustrates that a pattern image 220 in the second stage is generated from the pattern image 210 in the first stage, a pattern image 230 in the third stage is generated from the pattern image 220 in the second stage, and a pattern image 240 in the fourth stage is generated from the pattern image 230 in the third stage.

Next, the CPU 101 applies the edge extraction filter for extracting the contour set to the pattern image in the (L+1)-th stage and generates a template image candidate corresponding to a template image candidate including the contour set (S5). The extraction method is similar to step S2.

FIG. 3B illustrates that a template image candidate 222 including a contour set 221 in the second stage is generated from the pattern image 220 in the second stage, and a template image candidate 232 including a contour set 231 in the third stage is generated from the pattern image 230 in the third stage. FIG. 3B also illustrates that a template image candidate 242 including a contour set 241 in the fourth stage is generated from the pattern image 240 in the fourth stage. It is noted that the contour set 221 in the second stage is constituted by three contours including contours 221A, 221B, and 221C.

Next, the CPU 101 calculates a size of the contour set as a size of the feature image in the template image candidate in the (L+1)-th stage (S6). Herein, an area of a figure surrounded by the contour set is used as the size of the contour set.

In the case of the contour set 221 in the template image 222 in the second stage, an area of a figure obtained by calculating a logical sum of the figure surrounded by all the contours including the contour 221A, the contour 221B, and the contour 221C, that is, a figure indicated by a hatched part in FIG. 4B, is calculated. The area of this figure is calculated as the size of the contour set 221 (feature image).

Next, the CPU 101 determines whether or not the number of stages of the pyramid is to be increased, that is, whether or not the size of the contour set in the template image candidate in the (L+1)-th stage is larger than or equal to a previously set threshold (S7).

When the size of the contour set, that is, the area of the figure surrounded by the contour set is smaller than the threshold, the pattern tends to collapse, and it becomes difficult to perform the accurate search.

When the area of the figure is particularly small, for example, when the area becomes 1, the distinction between the pattern intended to be searched for and the noise becomes difficult, an erroneous comparison may be performed. For that reason, this threshold is set, for example, as 4×4 to such an extent that the distinction between the pattern intended to be searched for and the noise can be realized.

When it is determined that the size of the contour set in the template image candidate is larger than or equal to the threshold (S7: Yes), the CPU 101 increases the index L by 1 (S8), and the flow returns to the processing in step S4. At that time, the CPU 101 sets the template image candidate having the size of the contour set included in the generated template image candidate which is larger than or equal to the threshold as the template image constituting the first pyramid 200. For example, in a case where the size of the contour set 221 of the template image candidate 222 is larger than or equal to the threshold, the template image candidate 222 is set as the template image 222 constituting the first pyramid 200.

When it is determined that the size of the contour set in the template image candidate is smaller than the threshold (S7: No), the CPU 101 ends the repetition processing in steps S4 to S8, that is, the increase in the number of stages of the pyramid and determines L as a number of stages Lmax of the pyramid (S9).

The data structure including the contour set from the first stage to Lmax-th stage generated by the above-described processing corresponds to the first pyramid 200. FIG. 3B illustrates a case where the number of stages Lmax of the pyramid regarding the first pyramid 200 is 4, and the generated template image candidate in the fifth stage (not illustrated) is below the threshold and is therefore not set in the first pyramid 200. Thus, the template images 212, 222, 232, and 242 in the four stages constitute the first pyramid 200.

Herein, since the template image candidate 212 generated in step S2 is the image having the original resolution, the size of the feature image (contour set) is larger than or equal to the threshold even without performing the threshold determination. Therefore, this is set as the template image 212 constituting the first pyramid 200 without performing the threshold determination as in step S7.

As described above, according to the first exemplary embodiment, the CPU 101 generates the plurality of template image candidates having different resolutions from each other in steps S2 and S5. The CPU 101 then sets the template image candidate having the size of the feature image included in the generated template image candidates which is larger than or equal to the threshold as the template image constituting the first pyramid 200 on the basis of the determination in step S7.

In this manner, the CPU 101 sets the number of stages of the first pyramid 200 such that the size of the feature image (the size of the contour set) included in each of the template images 212, 222, 232, and 242 in the first pyramid 200 is not smaller than the threshold. Thus, since the feature image (contour) included in each of the template images 212, 222, 232, and 242 constituting the first pyramid 200 does not collapse, the probability of missing the correct answer in the search in the intermediate stage of the pyramid is decreased, and the search accuracy is improved in the template matching based on the coarse-to-fine search method.

Next, the second process of generating the second pyramid from the search target image will be described. The CPU 101 generates the second pyramid so as to have the same number of stages as the number of stages of the first pyramid. That is, the CPU 101 generates the second pyramid by hierarchizing a plurality of search target images having different resolutions from each other corresponding to the same resolutions as the template images in the first pyramid in order of the resolution.

Figure 5:
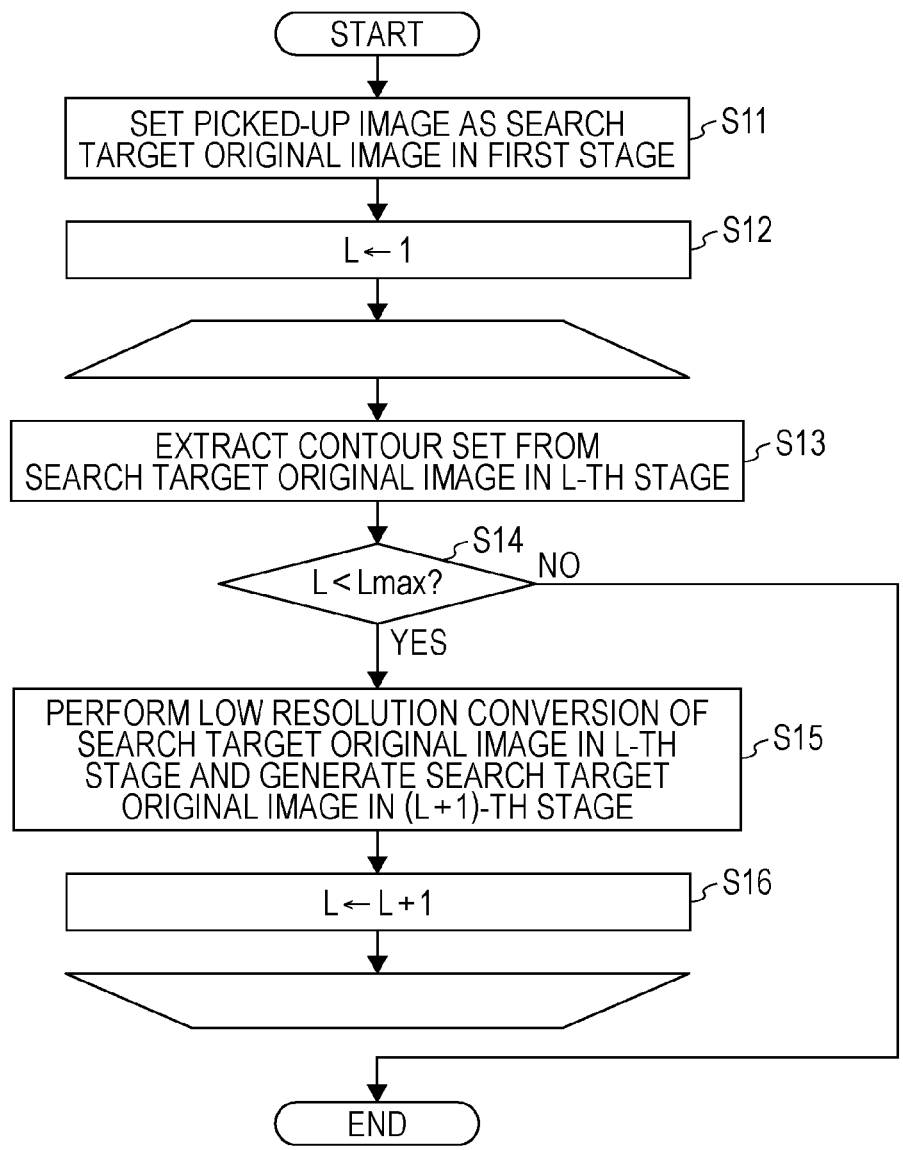
FIG. 5 is a flow chart illustrating a second process of the image processing method according to the first exemplary embodiment of the present invention.
Figure 6A:
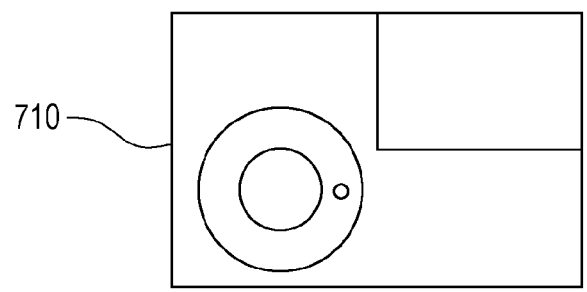
FIGS. 6A to 6C are explanatory diagrams for describing a second pyramid generated in the second process of the image processing method according to the first exemplary embodiment of the present invention.
Figure 6B:
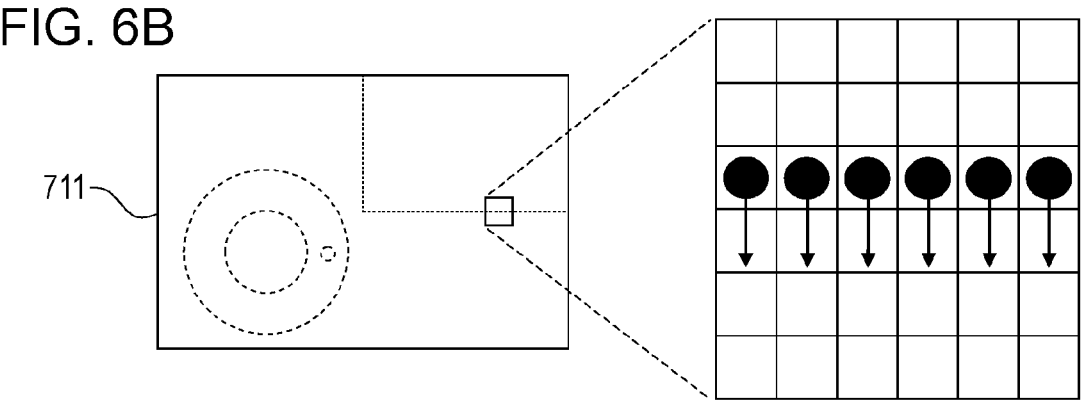
Figure 6C:
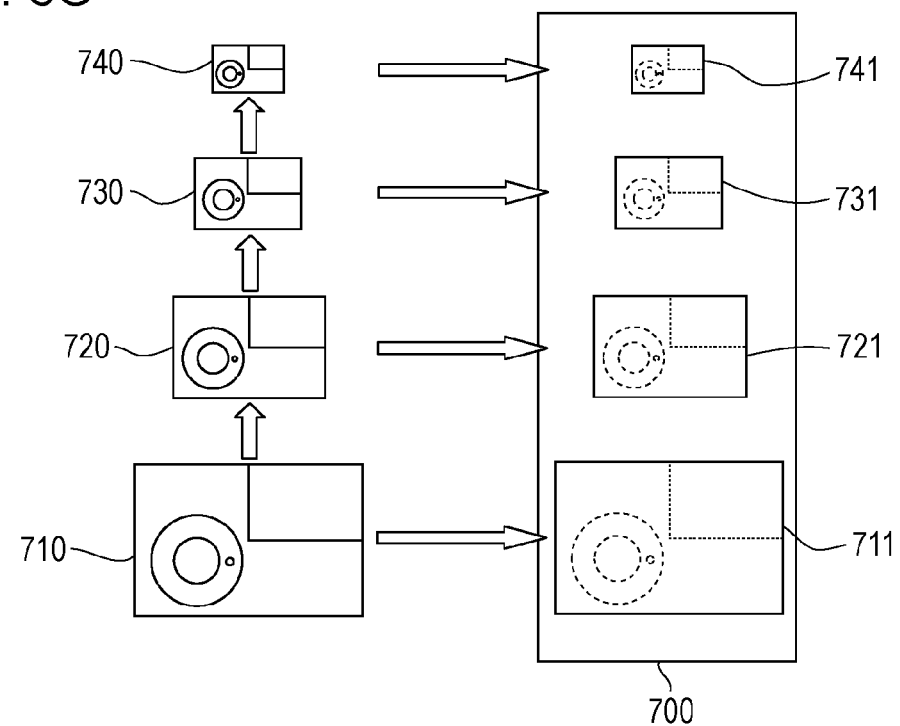

FIG. 5 is a flow chart illustrating a second process of the image processing method by the image processing apparatus according to the first exemplary embodiment of the present invention. FIGS. 6A to 6C are explanatory diagrams for describing the second pyramid generated in the second process. FIG. 6A illustrates a picked-up image (search target original image) obtained by picking up an image of the search target (work), FIG. 6B illustrates a search target image including a contour generated by extracting the picked-up image by the edge extraction filter, and FIG. 6C illustrates an example of the second pyramid. Hereinafter, descriptions will be given along the flow chart illustrated in FIG. 5.

The CPU 101 of the image processing apparatus 100 obtains the picked-up image in which the work is picked up illustrated in FIG. 6A from the input apparatus 130 and sets this image as a search target original image 710 in the first stage.

Next, the CPU 101 initializes the index L of the pyramid stage to 1 (S12).

Next, the CPU 101 applies the edge extraction filter such as the Sobel filter or the Canny filter to the search target original image similarly as in step S2 and extracts the contour set constituted by one or more contours. The CPU 101 then generates a search target image including the image of the contour set (S13). For example, in the case of L=1, the CPU 101 applies the edge extraction filter to the search target original image 710 illustrated in FIG. 6A and generates a search target image 711 illustrated in FIG. 6B. In this step S13, the search target image 711 in the first stage corresponding to a lowermost layer (bottom stage) of a second pyramid 700 illustrated in FIG. 6C is set.

Next, the CPU 101 determines whether or not L is lower than Lmax, that is, whether or not the number of stages of the pyramid is to be increased (S14).

In a case where L is lower than Lmax (S14: Yes), the CPU 101 performs the low resolution conversion of the search target original image in the L-th stage and generates the search target original image in the (L+1)-th stage (S15). The conversion method is similar to step S4 in FIG. 2.

Next, the CPU 101 increases the index L by 1 (S16), and the flow returns to the processing in step S13.

In a case where L becomes higher than or equal to Lmax (S14: No), that is, a case where L=Lmax is established, the CPU 101 ends the increase in the number of stages of the pyramid and sets the search target image in the Lmax-th stage in the second pyramid 700, so that the generation of the second pyramid 700 is ended.

The data structure including the contour set from the first stage to Lmax-th stage generated by the above-described processing corresponds to the second pyramid 700. FIG. 6C illustrates an example in a case where the number of stages Lmax of the pyramid regarding the second pyramid 700 is 4. That is, the search target images 711, 721, 731, and 741 having different resolutions from each other are generated from the search target original images 710, 720, 730, and 740 having different resolutions from each other.

It is noted that the processing (second process) for generating the second pyramid 700 is not limited to this, and various modifications can be made. As illustrated in FIG. 6C, the case where the search target original images 720, 730, and 740 are generated have been described, but the search target images 721, 731, and 741 may be generated by performing the low resolution conversion of the search target image 711 without generating the search target original images 720, 730, and 740, for example.

As described above, the CPU 101 generates the second pyramid 700 having the same number of stages as the first pyramid 200 by hierarchizing the plurality of search target images 721, 731, and 741 having different resolutions from each others corresponding to the same resolutions of the respective template images 212, 222, 232, and 242 in the first pyramid 200 in order of the resolution.

Next, descriptions will be given of a search process of searching for a pattern position having a highest matching degree with the feature image included in the template image among the search target images 711, 721, 731, and 741 by using the first pyramid 200 and the second pyramid 700. In this search process, the CPU 101 performs search processing for searching for the feature image (contour set) included in the template image of the first pyramid 200 from the search target image of the second pyramid 700 in the hierarchy of the same resolution consecutively from the hierarchy where the resolution is the lowest.

Figure 8:
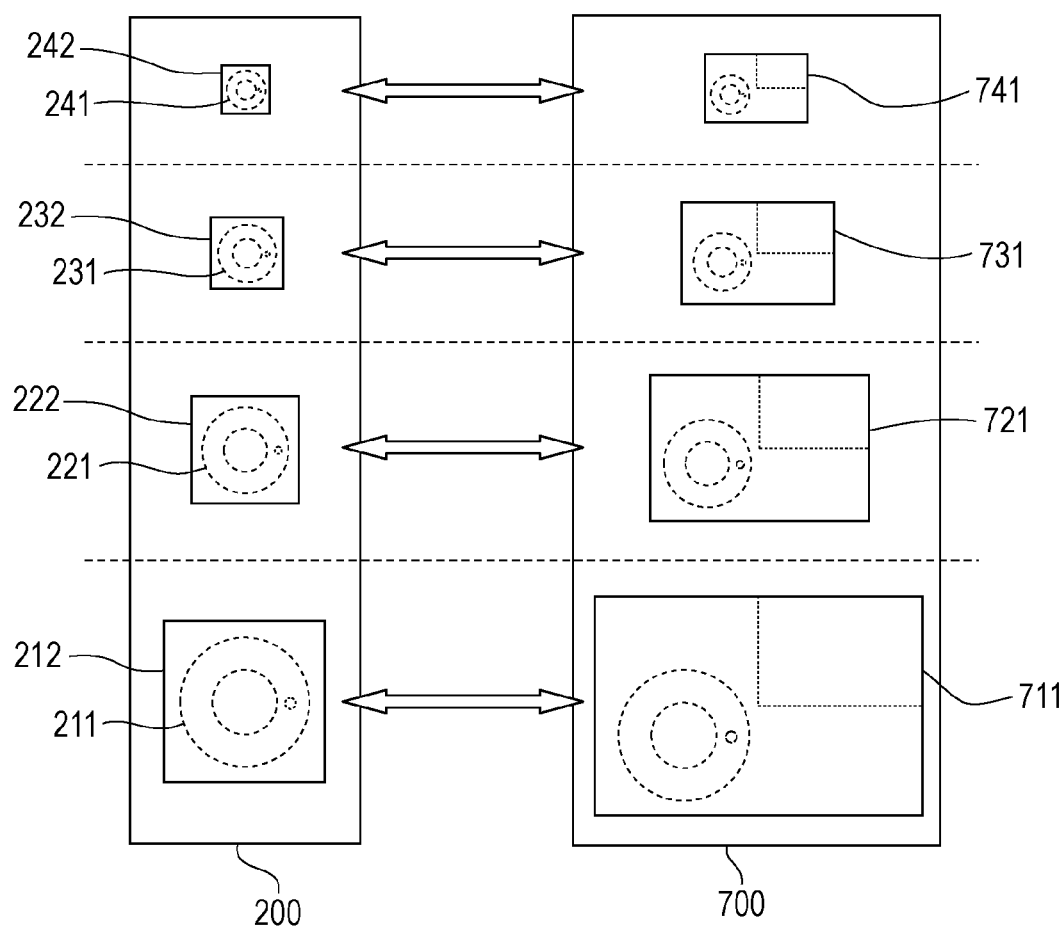
FIG. 8 is an explanatory diagram for describing the first pyramid and the second pyramid generated according to the first exemplary embodiment of the present invention.
Figure 9A:
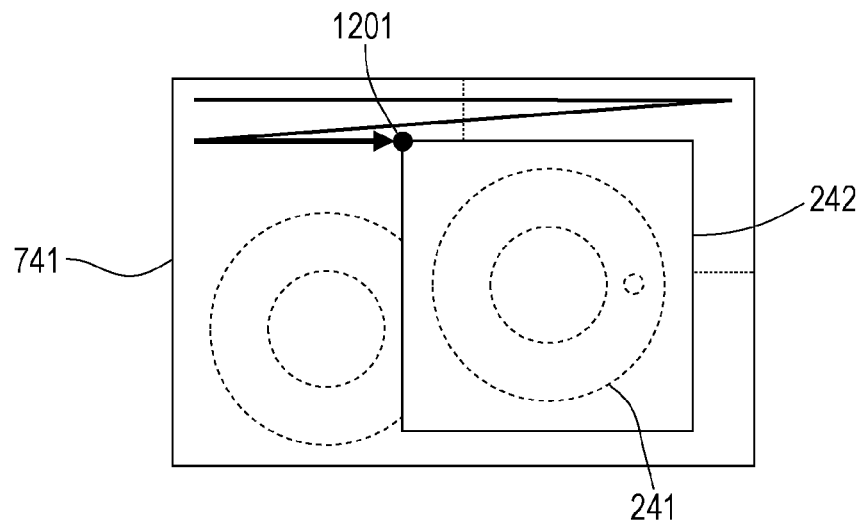
FIGS. 9A and 9B are explanatory diagrams for describing a search process of the image processing method according to the first exemplary embodiment of the present invention.
Figure 9B:
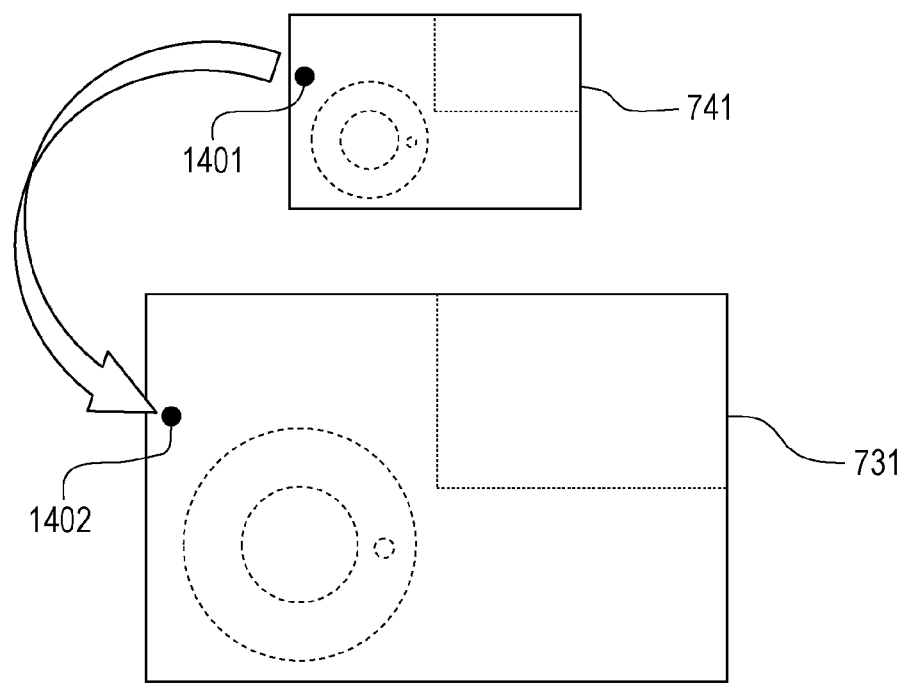

FIG. 7 is a flow chart illustrating a search process of searching for a pattern position on the search target images 711, 721, 731, and 741 by the image processing apparatus 100 according to the first exemplary embodiment of the present invention. FIG. 8 is an explanatory diagram for describing the first pyramid and the second pyramid. FIGS. 9A and 9B are explanatory diagrams for describing the search processing in the search process of the image processing method by the image processing apparatus 100 according to the first exemplary embodiment of the present invention. Hereinafter, descriptions will be given along the flow chart illustrated in FIG. 7.

The CPU 101 initializes the index L of the pyramid stage at which the coarse-to-fine search is started to Lmax (S21). As illustrated in FIG. 8, in the case of the first and second pyramids 200 and 700 having the four stages, Lmax=4 is set, and L is initialized to 4 in this step S21.

Next, the CPU 101 searches for a candidate point in the L-th stage by using the contour set in the L-th stage of the first pyramid 200 and the contour set in the L-th stage of the second pyramid 700 (S22). In actuality, the search for the candidate point is performed by calculating the matching degree while the template image in the L-th stage of the first pyramid 200 which is represented in the image format is shifted by way of raster scanning from an upper left corner of the search target image in the L-th stage of the second pyramid 700 which is also represented in the image format.

As illustrated in FIG. 9A, in step S22, an upper left corner pixel 1201 of the template image 242 including the contour set 241 in the fourth stage of the first pyramid 200 which is represented in the image format is set as a reference point. The raster scanning of the reference point 1201 is performed from the upper left corner of the search target image 741 including the contour set in the fourth stage of the second pyramid 700 which is represented in the image format. Coordinates of the reference point 1201 at which the matching degree of the two contour sets becomes high are set as the candidate point, but the number of the candidate points is not limited to one, and a plurality of candidate points may exist in some cases. The matching degree of the two contour sets is calculated as represented in Expression (1) by using an edge direction.

$$\frac{1}{N_T} \sum_{n=1}^{N_L} |\cos(I_{Ln} - T_{Ln})| \tag{1}$$

Where $N_L$ denotes the number of edge points in the contour set in the L-th stage of the first pyramid, $T_{Ln}$ denotes an edge direction of an n-th edge point in the contour set in the L-th stage of the first pyramid, and $I_{Ln}$ denotes an edge direction of an edge point at a position corresponding to $T_L$ in the L-th stage of the second pyramid. In Expression (1), an edge direction difference between the contour set of the first pyramid and the contour set of the second pyramid is calculated. In a case where the two contour sets are completely matched with each other, 1 is obtained, and in a case where the two contour sets are not matched with each other, 0 is obtained. Subsequently, coordinates on the contour set in the L-th stage of the second pyramid at which the matching degree becomes larger than or equal to the threshold are extracted as the candidate point. Table illustrates examples of the candidate points. In this example, eight candidate points are enumerated in order of the matching degree.

TABLE

| # | CANDIDATE POINT | MATCHING DEGREE |
|---|---|---|
| 1 | (10, 1000) | 0.9 |
| 2 | (9, 1000) | 0.86 |
| 3 | (11, 1000) | 0.84 |
| 4 | (10, 999) | 0.82 |
| 5 | (10, 1001) | 0.8 |
| 6 | (9, 999) | 0.78 |
| 7 | (9, 1001) | 0.76 |
| 8 | (11, 1001) | 0.74 |

Next, the CPU 101 determines whether or not the current pyramid stage is not the bottom stage (the first stage), that is, whether or not L>1 is established (S23).

When it is determined that L>1 is established, that is, the current pyramid stage is not the bottom stage (the first stage) (S23: Yes), the CPU 101 repeats the processing for lowering the pyramid stage by one to narrow down the candidate points.

Specific descriptions will be given. The CPU 101 decreases the index L of the pyramid stage by 1 (S24) and performs coordinate conversion of the candidate point of the search result in the (L+1)-th stage into a point of the contour set in the L-th stage of the second pyramid 700 which is represented in the image format (S25). FIG. 9B illustrates an example in which the coordinate conversion of a candidate point 1401 in the fourth stage into a candidate point 1402 in the third stage is performed. In this case, since the resolution is doubled when the pyramid stage is lowered by one, coordinates obtained by respectively multiplying the coordinates X and Y of the candidate point in the (L+1)-th stage by 2 become the coordinates of the candidate point in the L-th stage in the actual coordinate conversion.

Next, the CPU 101 narrows down the candidate points in the L-th stage by using the contour set in the L-th stage of the first pyramid 200 and the contour set in the L-th stage of the second pyramid 700 (S26). In actuality, the matching degrees in a case where the upper left corner pixel of the template image including the contour set in the L-th stage of the first pyramid 200 is located at the respective candidate points and the surrounding positions are calculated. In a case where the matching degree is below the threshold, this point is excluded from the candidate points. The calculation method for the matching degree is similar to step S22.

While the above-described processing in steps S23 to step S26 is repeated, the search is roughly performed by the low resolution first, and the search is more accurately performed by gradually increasing the resolution.

When it is determined in step S23 that L>1 is not established, that is, the current pyramid stage is the bottom stage (the first stage) (S23: No), the CPU 101 ends the repetition processing. With the above-described processing, the coordinates of the candidate point on the search target image 711 including the contour set in the first stage of the second pyramid 700 become the coordinates intended to be obtained on the picked-up image 710.

Figure 10:
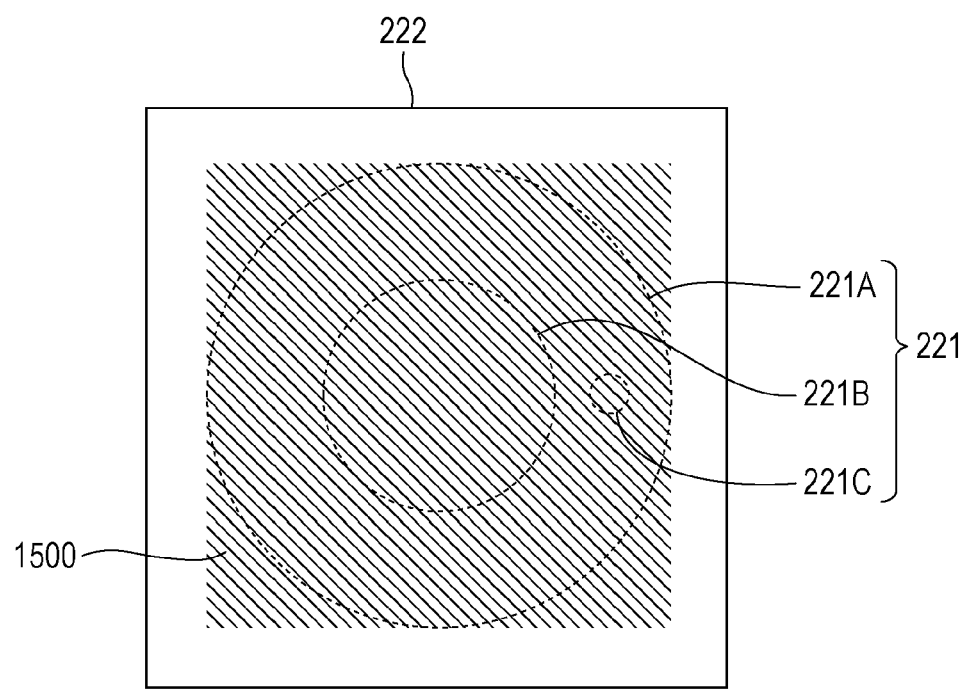
FIG. 10 is an explanatory diagram for describing another example in a calculation method for a size of a contour set generated according to the first exemplary embodiment of the present invention.

It is noted that, according to the first exemplary embodiment, the example in which the area of the figure surrounded by the contour set is used as the size of the contour set corresponding to the size of the feature image has been illustrated but is not limited to this. FIG. 10 is an explanatory diagram for describing another example in the calculation method for the size of the contour set generated according to the first exemplary embodiment of the present invention. It is noted that FIG. 10 illustrates the template image candidate in the second stage as an example. As in FIG. 10, for the size of the contour set 221, an area or a width and a height of a circumscribed rectangular (circumscribed FIG. 1500 of the contour set 221 may be used as the reference for the size. Furthermore, a total sum of lengths of the respective contours 221A to 221C of the contour set 221 may be set as a reference for the size.

Accordingly, for example, even in a case where the area of the contour set is not to be calculated such as a case where the contour set does not have a closed shape, the size of the contour set can be calculated.

In addition, according to the first exemplary embodiment, the case has been described in which the template image candidates 222, 232, and 242 are generated by applying the edge extraction filter to the pattern images 220, 230, and 240 that have been subjected to the low resolution conversion when the first pyramid 200 is generated, but the configuration is not limited to this. For example, instead of performing the low resolution conversion of the pattern image 210, the low resolution conversion of the template image 212 may be directly performed to generate the template image candidates 222, 232, and 242.

Figure 11:
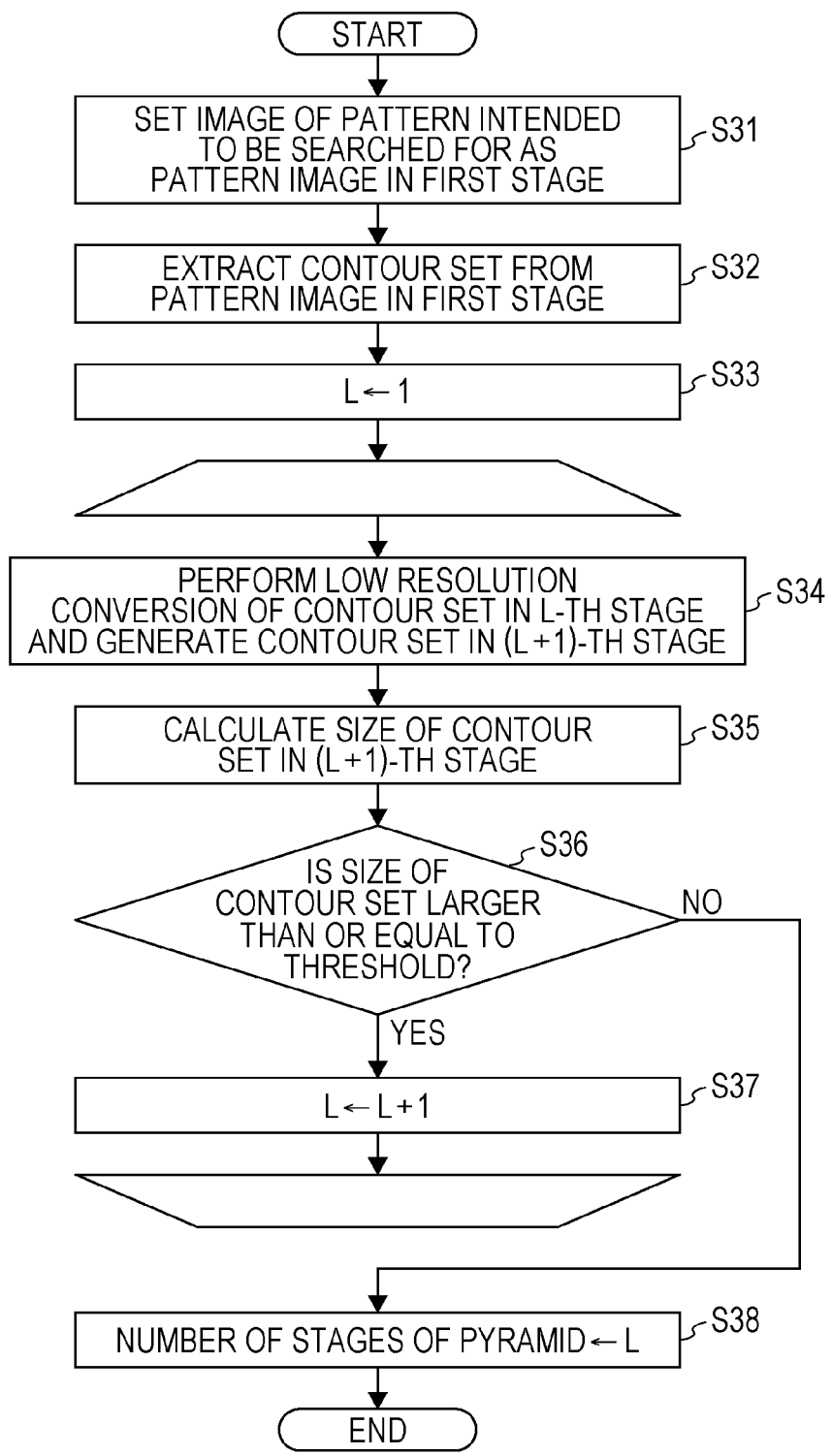
FIG. 11 is a flow chart illustrating another example of the first process of the image processing method according to the first exemplary embodiment of the present invention.
Figure 12:
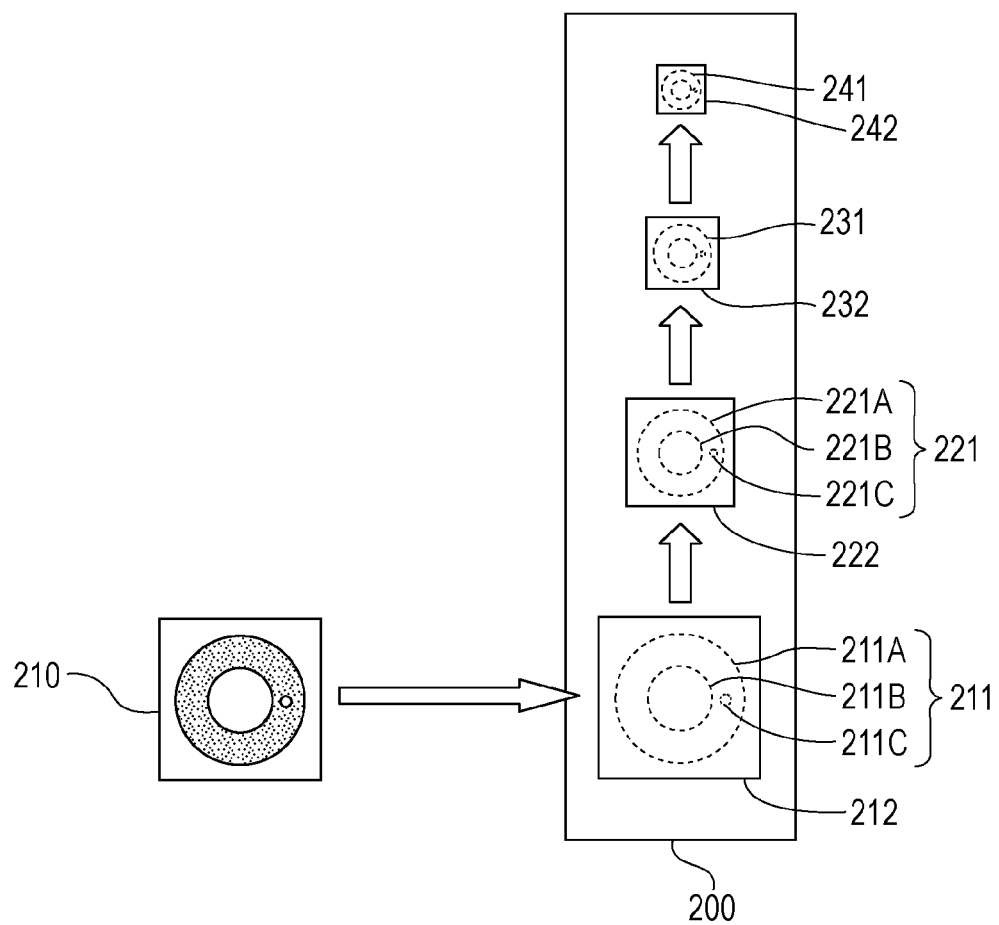
FIG. 12 is an explanatory diagram for describing the first pyramid generated in the other example of the first process of the image processing method according to the first exemplary embodiment of the present invention.

FIG. 11 is a flow chart illustrating another example of the processing in the first process of the image processing method according to the third exemplary embodiment of the present invention. FIG. 12 is an explanatory diagram for describing the first pyramid generated in another example of the processing in the first process of the image processing method according to the first exemplary embodiment of the present invention.

The CPU 101 obtains the image in which the pattern intended to be searched for is picked up, from the input apparatus 130 and sets this image as the pattern image 210 in the first stage (S31).

Next, the CPU 101 applies the edge extraction filter such as the Sobel filter or the Canny filter to the pattern image 210 in the first stage of the pyramid and extracts the contour set 211 constituted by one or more contours. The CPU 101 then generates the template image candidate 212 including the image (feature image) of the contour set 211 (S32). The CPU 101 sets the template image candidate 212 in the lowermost layer (the bottom stage, the first stage) of the first pyramid 200 as the template image 212.

Next, the CPU 101 initializes the index L of the pyramid stage to 1 (S33).

Next, the CPU 101 performs the low resolution conversion of the template image including the contour set in the L-th stage and generates the template image candidate including the contour set in the (L+1)-th stage (S34).

Next, the CPU 101 calculates the size of the contour set (feature image) in the template image candidate in the (L+1)-th stage (S35).

Next, the CPU 101 determines whether or not the number of stages of the pyramid is to be increased, that is, whether or not the size of the contour set in the template image candidate in the (L+1)-th stage is larger than or equal to a previously set threshold (S36).

When it is determined that the size of the contour set in the template image candidate is larger than or equal to the threshold (S36: Yes), the CPU 101 increases the index L by 1 (S37), and the flow returns to the processing in step S34. At that time, the CPU 101 sets the template image candidate having the size of the contour set included in the generated template image candidate which is larger than or equal to the threshold as the template image constituting the first pyramid 200. For example, in a case where the size of the contour set 221 of the template image candidate 222 is larger than or equal to the threshold, the template image candidate 222 is set as the template image 222 constituting the first pyramid 200.

When it is determined that the size of the contour set in the template image candidate is smaller than the threshold (S36: No), the CPU 101 ends the repetition processing in steps S34 to S37, that is, the increase in the number of stages of the pyramid and determines L as the number of stages Lmax of the pyramid (S38).

As illustrated above in FIG. 12, the low resolution conversion of the template image including the contour set which is represented in the image format may be directly performed to generate the first pyramid 200. FIG. 12 illustrates a case where the number of stages Lmax of the pyramid regarding the first pyramid 200 is 4, and the generated template image candidate in the fifth stage (not illustrated) is below the threshold and is therefore not set in the first pyramid 200. Thus, the first pyramid 200 is constituted by the template images 212, 222, 232, and 242 in the four stages.

Second Exemplary Embodiment

Figure 13:
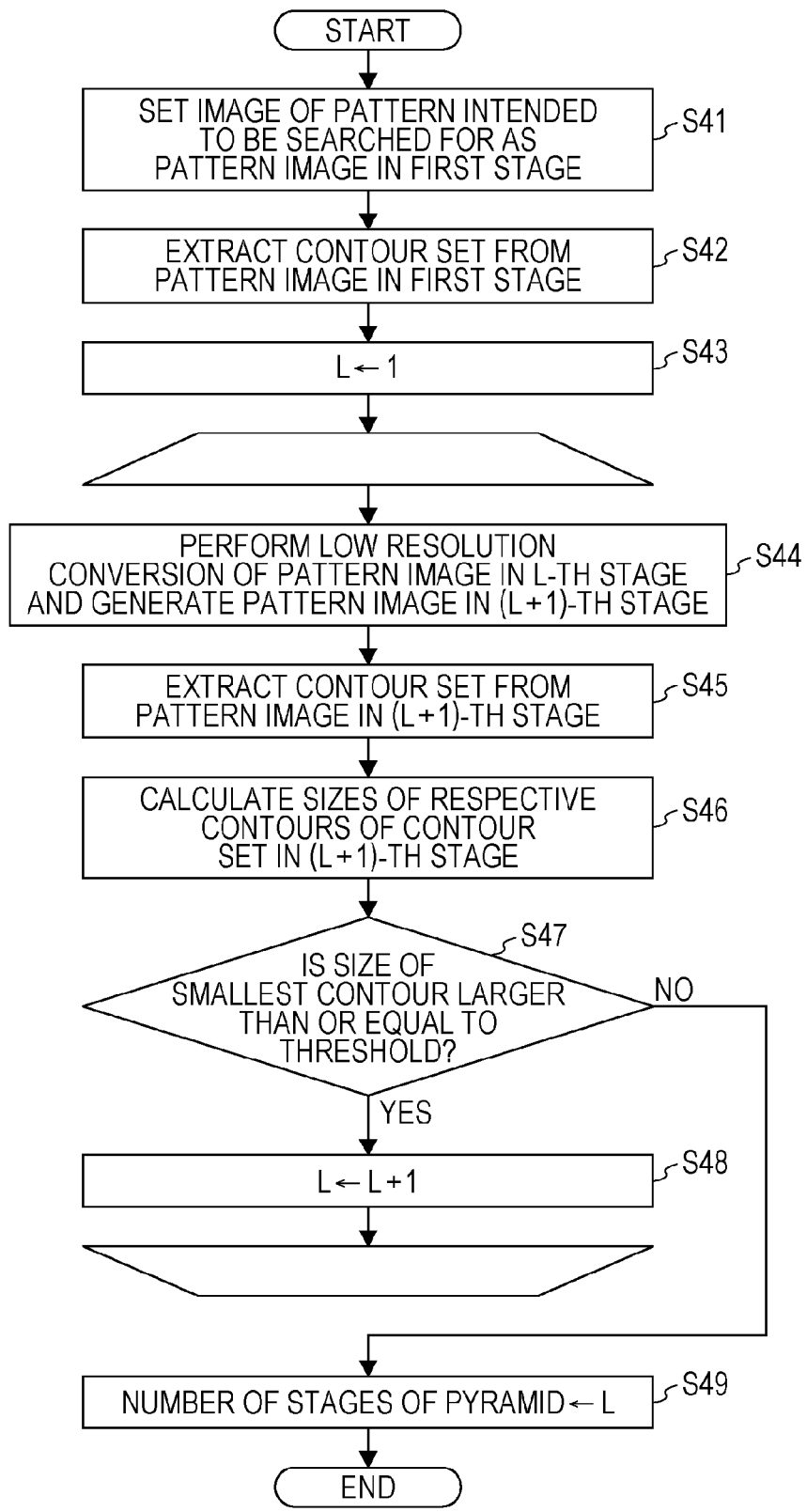
FIG. 13 is a flow chart illustrating the first process of the image processing method according to a second exemplary embodiment of the present invention.
Figure 14A:
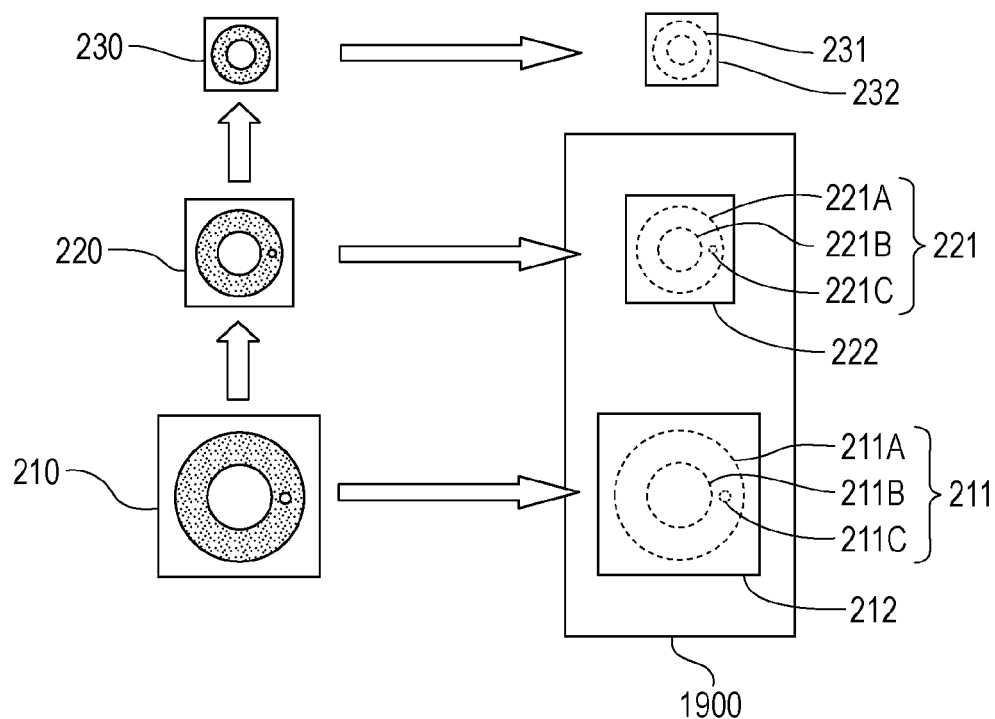
FIGS. 14A and 14B are explanatory diagrams for describing the first pyramid generated in the first process of the image processing method according to the second exemplary embodiment of the present invention.
Figure 14B:
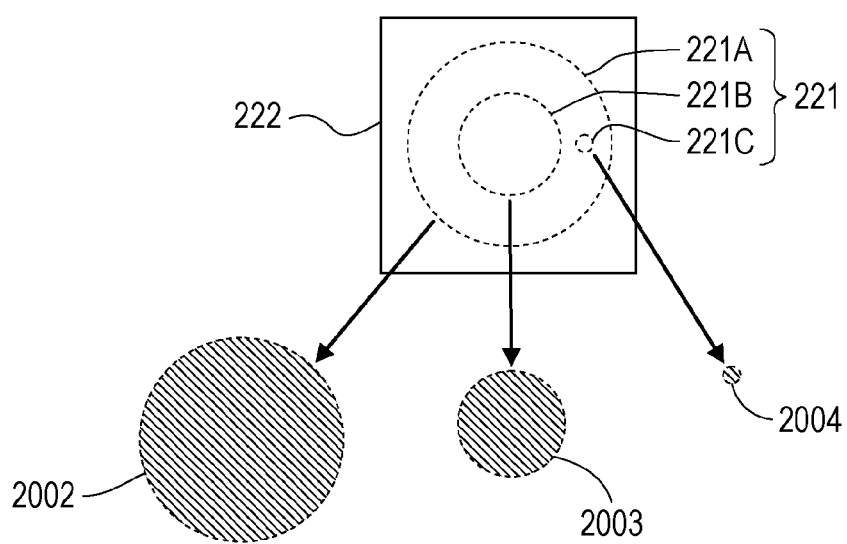

Next, the image processing method by the image processing apparatus according to a second exemplary embodiment of the present invention will be described. FIG. 13 is a flow chart illustrating the processing in the first process of the image processing method by the image processing apparatus according to the second exemplary embodiment of the present invention. FIGS. 14A and 14B are explanatory diagrams for describing the first pyramid generated in the first process. It is noted that a configuration of the image processing apparatus according to the second exemplary embodiment is similar to that of the first exemplary embodiment described above, and descriptions thereof will be omitted. In addition, the second process and the search process by the image processing apparatus according to the second exemplary embodiment are also similar to those according to the first exemplary embodiment described above, and descriptions thereof will be omitted.

According to the first exemplary embodiment described above, the example in which the number of stages of the pyramid is determined on the basis of the size of the entire contour set to such an extent that the distinction between the pattern intended to be searched for and the noise can be realized has been described. However, a part of contours constituting the contour set may function as a feature for determining, for example, how many times the pattern is rotated, and if such a contour collapses, an erroneous comparison may be carried out in some cases. To avoid the above-described erroneous comparison, in particular, the smallest contour is set so as not to collapse.

In view of the above, according to the second exemplary embodiment, the size of the feature image used for the threshold determination in the first process is set as the size of the image of the smallest contour among the contours included in the contour set, and the threshold is set such that the smallest contour does not collapse.

Hereinafter, descriptions will be given of a method of determining the number of stages of the pyramid on the basis of the size of the smallest contour among the contour set constituting the pattern intended to be searched for in a case where the pattern position on the target image is searched for by the coarse-to-fine search method along the flow chart illustrated in FIG. 13.

The CPU 101 of the image processing apparatus 100 obtains the image in which the pattern intended to be searched for is picked up which is illustrated in FIG. 3A, from the input apparatus 130 and sets this image as the pattern image 210 in the first stage (S41).

Next, the CPU 101 applies the edge extraction filter such as the Sobel filter or the Canny filter to the pattern image 210 in the first stage of the pyramid and extracts the contour set 211 constituted by one or more contours as the feature image (S42). The CPU 101 then generates the template image candidate 212 including the image (feature image) of the contour set 211. That is, in step S42, the template image candidate 212 including the contour set 211 constituted by the plurality of the contours 211A, 211B, and 211C is obtained by applying the edge extraction filter to the pattern image 210. The CPU 101 sets the template image candidate 212 in the lowermost layer (the bottom stage, the first stage) of a first pyramid 1900 as the template image 212.

Next, the CPU 101 initializes the index L of the pyramid stage to 1 (S43).

Next, the CPU 101 generates the pattern image in the (L+1)-th stage by performing the low resolution conversion of the pattern image in the L-th stage (S44). The processing of the low resolution conversion is similar to step S4 in FIG. 2 described above in the first exemplary embodiment.

Next, the CPU 101 extracts the contour set from the pattern image in the (L+1)-th stage and generates the template image candidate corresponding to the template image candidate including the contour set (S45). The extraction method is similar to step S42.

FIG. 14A illustrates that the template image candidate 222 including the contour set 221 in the second stage is generated from the pattern image 220 in the second stage, and the template image candidate 232 including the contour set 231 in the third stage is generated from the pattern image 230 in the third stage. It is noted that the contour set 221 in the second stage is constituted by the three contours including the contours 221A, 221B, and 221C.

Next, the CPU 101 calculates the sizes of the respective contours included in the contour set in the template image candidate in the (L+1)-th stage (S46). Herein, the area of the figure surrounded by the contour is set as the size of the contour included in the contour set.

In the case of the contour set 221 in the template image 222 in the second stage which is illustrated in FIG. 14B, the areas of the figures surrounded by the respective contours 221A, 221B, and 221C, that is, the areas of FIGS. 2002, 2003, and 2004 indicated by hatched parts in FIG. 14B are respectively calculated.

Next, the CPU 101 determines whether or not the number of stages of the pyramid is to be increased, that is, the CPU 101 selects the contour having the smallest size among the contours included in the contour set in the template image candidate in the (L+1)-th stage and determines whether or not the size of the smallest contour is larger than or equal to a previously set threshold (S47). According to the second exemplary embodiment, the size of the feature image in the template image candidate in the (L+1)-th stage refers to the size of the contour having the smallest size among the contours included in the contour set.

When it is determined that the size of the smallest contour in the template image candidate is larger than or equal to the threshold (S47: Yes), the CPU 101 increases the index L by 1 (S48), and the flow returns to the processing in step S44. At that time, the CPU 101 sets the template image candidate where the size of the smallest contour included in the generated template image candidate is larger than or equal to the threshold as the template image constituting the first pyramid 1900. For example, in FIG. 14B, the contour having the smallest size (area) among the contours 221A, 221B, and 221C included in the contour set 221 of the template image candidate 222 is the contour 221C. In a case where the size of the contour 221C is larger than or equal to the threshold, the template image candidate 222 is set as the template image 222 constituting the first pyramid 1900.

When it is determined that the size of the contour set in the template image candidate is smaller than the threshold (S47: No), the CPU 101 ends the repetition processing in steps S44 to S48, that is, the increase in the number of stages of the pyramid and determines L as the number of stages Lmax of the pyramid (S49). In this manner, according to the second exemplary embodiment, the number of stages of the pyramid is increased such that the smallest contour does not collapse.

The data structure including the contour set from the first stage to Lmax-th stage generated by the above-described processing corresponds to the first pyramid 1900. FIG. 14A illustrates a case where the number of stages Lmax of the pyramid regarding the first pyramid 1900 is 2.

Herein, since the template image candidate 212 generated in step S42 is the image having the original resolution, the size of the feature image (smallest contour) is larger than or equal to the threshold even without performing the threshold determination. Therefore, this is set as the template image 212 constituting the first pyramid 1900 without performing the threshold determination as in step S47.

With regard to the generation of the second pyramid, the generation may be performed in accordance with the flow chart in FIG. 5 similarly as in the above-described first exemplary embodiment. The number of stages of the pyramid regarding the second pyramid is set as Lmax that is the same as the number of stages of the first pyramid. The method of searching for the pattern position on the target image by using the first pyramid and the second pyramid is executed in accordance with the flow chart in FIG. 7 similarly as in the above-described first exemplary embodiment.

As described above, according to the second exemplary embodiment, the CPU 101 generates the plurality of template image candidates having different resolutions from each other in steps S42 and S45. The CPU 101 then sets the template image candidate where the size of the feature image included in the generated template image candidate is larger than or equal to the threshold as the template image constituting the first pyramid 1900 on the basis of the determination in step S47.

In this manner, the CPU 101 sets the number of stages of the first pyramid 1900 such that the size of the feature image (the size of the smallest contour) included in each of the template images 212 and 222 in the first pyramid 1900 is not smaller than the threshold. Thus, the feature image (contour) included in each of the template images 212 and 222 constituting the first pyramid 1900 does not collapse. Therefore, the probability of missing the correct answer in the search in the intermediate stage of the pyramid is decreased, and the search accuracy is improved in the template matching based on the coarse-to-fine search method.

It is noted that, according to the second exemplary embodiment, the example in which the area of the figure surrounded by each of the contours is used as the size of each of the contours has been illustrated but is not limited to this. The area or the width and the height of the circumscribed rectangular (circumscribed figure) of each of the contours may be used as the reference for the size. Furthermore, the length of each the contours may be used as the reference for the size for each of the contours.

Accordingly, for example, even in a case where the area of the contour is not to be calculated such as a case where the contour does not have a closed shape, the size of the contour can be calculated.

In addition, according to the second exemplary embodiment, the case has been described in which, when the first pyramid 1900 is generated, the template image candidates 222 and 232 are generated by applying the edge extraction filter to the pattern images 220 and 230 that have been subjected to the low resolution conversion, but the configuration is not limited to this. For example, the template image candidates 222 and 232 may be generated by performing the low resolution conversion of the template image 212 instead of performing the low resolution conversion of the pattern image 210.

Third Exemplary Embodiment

Figure 15:
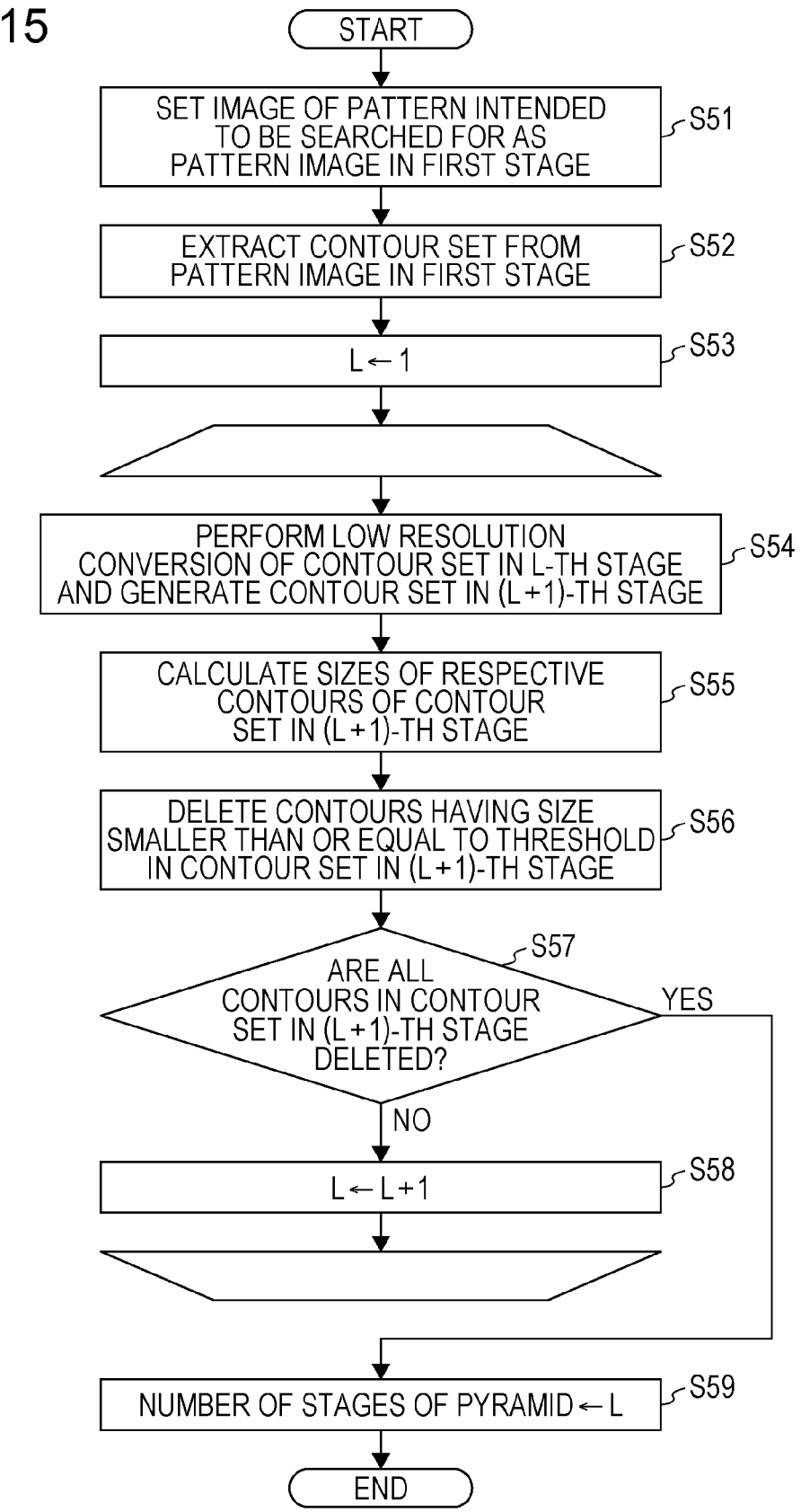
FIG. 15 is a flow chart illustrating the first process of the image processing method according to a third exemplary embodiment of the present invention.
Figure 16:
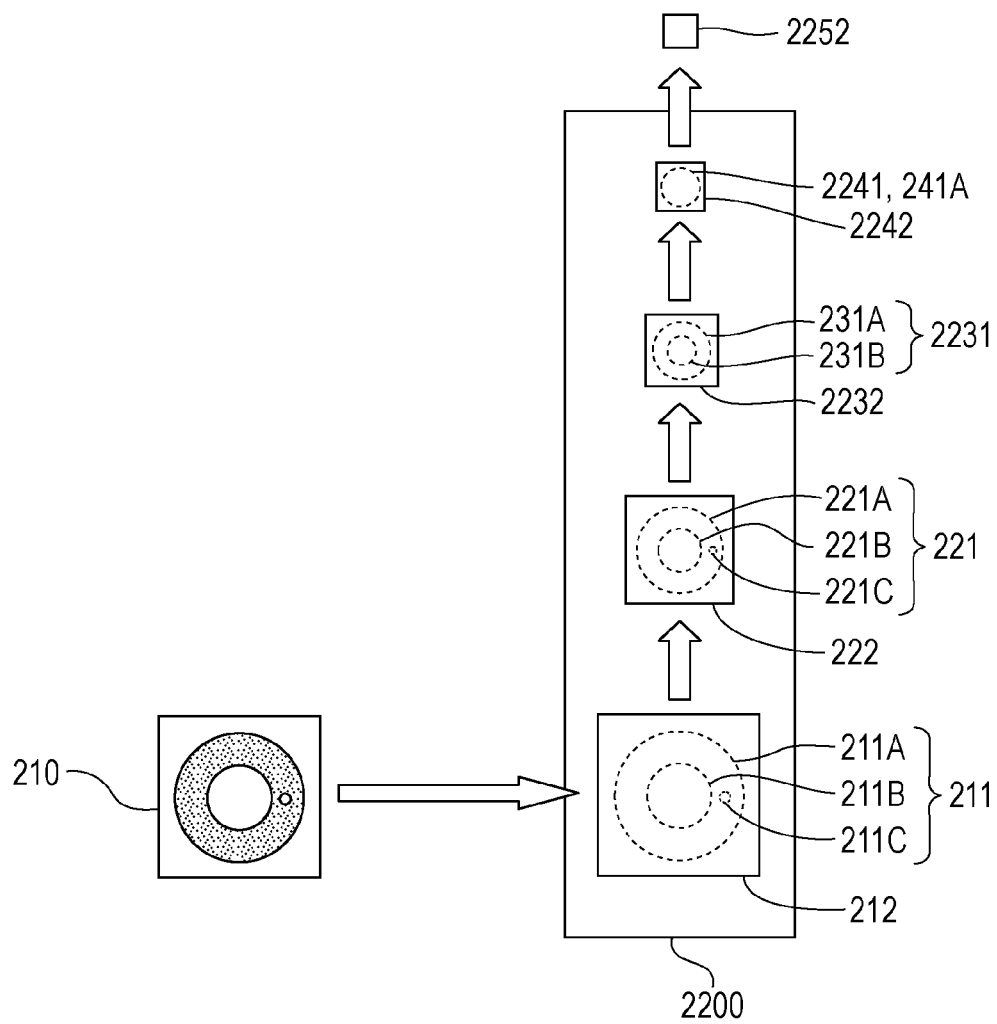
FIG. 16 is an explanatory diagram for describing the first pyramid generated in the first process of the image processing method according to the third exemplary embodiment of the present invention.

Next, the image processing method by the image processing apparatus according to a third exemplary embodiment of the present invention will be described. FIG. 15 is a flow chart illustrating the processing in the first process of the image processing method by the image processing apparatus according to the third exemplary embodiment of the present invention. FIG. 16 is an explanatory diagram for describing the first pyramid generated in the first process. It is noted that a configuration of the image processing apparatus according to the third exemplary embodiment is similar to that according to the above-described first exemplary embodiment, and descriptions thereof will be omitted. In addition, the second process and the search process by the image processing apparatus according to the third exemplary embodiment are also similar to those according to the above-described first exemplary embodiment, and descriptions thereof will be omitted.

Hereinafter, descriptions will be given along the flow chart illustrated in FIG. 15 on a method of determining the number of stages of the pyramid for each contour constituting the pattern intended to be searched for in a case where the pattern position on the target image is searched for by the coarse-to-fine search method.

The CPU 101 of the image processing apparatus 100 obtains the image in which the pattern intended to be searched for is picked up which is illustrated in FIG. 3A, from the input apparatus 130 and sets this image as the pattern image 210 in the first stage (S51).

Next, the CPU 101 applies the edge extraction filter such as the Sobel filter or the Canny filter to the pattern image 210 in the first stage of the pyramid and extracts the contour set 211 constituted by one or more contours as the feature image (S52). The CPU 101 then generates the template image candidate 212 including the image (feature image) of the contour set 211. That is, in step S52, the template image candidate 212 including the image of the contour set 211 constituted by the plurality of the contours 211A, 211B, and 211C is obtained by applying the edge extraction filter to the pattern image 210. The CPU 101 sets the template image candidate 212 in the lowermost layer (the bottom stage, the first stage) of a first pyramid 2200 as the template image 212.

Next, the CPU 101 initializes the index L of the pyramid stage to 1 (S53).

Next, the CPU 101 performs the low resolution conversion of the template image including the contour set in the L-th stage and generates the template image candidate including the contour set in the (L+1)-th stage (S54).

Next, the CPU 101 calculates the sizes of the respective contours of the contour set in the (L+1)-th stage (S55). Herein, the size of the contour is set as the area of the figure surrounded by the contour.

Next, the CPU 101 deletes the contour having the size smaller than or equal to the threshold among the contours included in the generated template image candidate in the (L+1)-th stage to set a new template image candidate (S56).

When the size of the contour, that is, the area of the figure surrounded by the contour becomes small, it is difficult to distinguish the contour from the noise, and an influence of the noise tends to be affected. For that reason, the contour having the small area after the low resolution conversion is excluded from the template image candidate so as not to be used for the search for in the pyramid stages corresponding to the (L+1)-th stage and above to set a new template image candidate.

In the example of FIG. 16, a contour in the second stage corresponding to the contour 211C in the first stage is the contour 221C, but the corresponding contour in the third stage is deleted. This means that the contour obtained by performing the low resolution conversion of the contour 211C is not used in the third stage and the fourth stage. Similarly, contours in the second stage and the third stage corresponding to the contour 211B in the first stage are the contour 221B and a contour 2231B, but the corresponding contours in the fourth stage are deleted. This means that the contours obtained by performing the low resolution conversion of the contour 211B are not used in the fourth stage.

Next, the CPU 101 determines whether or not all the contours are deleted in the template image candidate including the contour set in the (L+1)-th (S57).

When it is determined that the contour that has not been deleted exists (S57: No), the CPU 101 continues the increase in the number of stages of the pyramid. That is, the CPU 101 increases the index L by 1 (S58), and the flow returns to step S54. Then, the processing in steps S54 to S58 is repeated.

When it is determined that all the contours are deleted (S57: Yes), the CPU 101 ends the increase in the number of stages of the pyramid and determines L as the number of stages Lmax of the pyramid (S59), and the generation of the first pyramid 2200 is ended. The data structure including the contour set from the first stage to Lmax-th stage generated by the above-described processing corresponds to the first pyramid 2200.

That is, the CPU 101 generates a plurality of template image candidates that have different resolutions from each other and include the image of the contour set constituted by one or more contours extracted from the pattern image 210 corresponding to the original reference image as the feature image.

The CPU 101 then deletes the contour having the size smaller than or equal to the threshold among the contours included in the generated template image candidate to set a new template image candidate. The CPU 101 then sets the template image candidate having at least one contour remaining in the new template image candidate as the template image constituting the first pyramid 2200.

FIG. 16 illustrates an example of a case where the number of stages Lmax of the pyramid regarding the first pyramid 2200 is 4, and the numbers of stages of the pyramids of the contour 211A, the contour 211B, and the contour 211C in the first stage are respectively 4, 3, and 2.

First, the template image 212 will be described while it is assumed that the areas of the parts surrounded by the contours 211A, 211B, and 211C included in the template image candidate 212 corresponding to the image having the original size that has not been subjected to the low resolution conversion are larger than the threshold. Therefore, according to the third exemplary embodiment, since the size of each of the contours 211A to 211C is larger than the threshold even without performing the threshold determination, the template image candidate 212 is set as the template image 212 constituting the first pyramid 2200 without deleting the contour.

Next, with regard to the template image candidate 222 obtained by performing the low resolution conversion of the template image 212, all the included contours 221A, 221B, and 221C have the size larger than the threshold as a result of the threshold determination, and the template image candidate 222 is set as the template image 222 without deleting the contour.

Next, with regard to the template image candidate obtained by performing the low resolution conversion of the template image 222, the smallest contour among the three included contours has the size smaller than or equal to the threshold and is thus deleted to generate a new template image candidate 2232. Subsequently, since the contour set 2231 constituted by the contours 231A and 231B remains in the template image candidate 2232, the template image candidate 2232 is set as the template image 2232 constituting the first pyramid 2200.

Next, with regard to the template image candidate obtained by performing the low resolution conversion of the template image 2232, the smallest contour among the two included contours has the size smaller than or equal to the threshold and is thus deleted to generate a new template image candidate 2242. Subsequently, since the contour set 2241 constituted by the single contour 241A remains in the template image candidate 2242, the template image candidate 2242 is set as the template image 2242 constituting the first pyramid 2200.

Next, with regard to the template image candidate obtained by performing the low resolution conversion of the template image 2242, the included signal contour has the size smaller than or equal to the threshold and is thus deleted to generate a new template image candidate 2252. Subsequently, since all the contours are deleted in the template image candidate 2252, the template image candidate 2252 is not set as the template image constituting the first pyramid 2200, and the generation of the first pyramid 2200 is ended.

It is noted that with regard to the generation of the second pyramid, the generation may be performed along the processing flow chart in FIG. 5 similarly as in the above-described first exemplary embodiment. The generation is performed such that the number of stages of the pyramid regarding the second pyramid becomes the same as the number of stages Lmax of the first pyramid. In addition, with regard to the method of searching for the pattern position on the target image by using the first pyramid and the second pyramid, the search may be executed along the processing flow chart in FIG. 7 similarly as in the above-described first exemplary embodiment.

As described above, according to the third exemplary embodiment, the CPU 101 generates the plurality of template image candidates having the different resolutions from each other. The CPU 101 then deletes the contour having the size smaller than or equal to the threshold among the contours included in the generated template image candidate to set a new template image candidate. The CPU 101 then sets the template image candidate having at least one contour remaining in the new template image candidate as the template image constituting the first pyramid 2200.

In this manner, the CPU 101 sets the number of stages of the first pyramid 2200 such that the size of the contour (the size of the feature image) included in each of the template images 212, 222, 2232, and 2242 in the first pyramid 2200 is not smaller than the threshold. Thus, the feature image (contour) included in each of the template images 212, 222, 2232, and 2242 constituting the first pyramid 2200 does not collapse. Therefore, the probability of missing the correct answer in the search in the intermediate stage of the pyramid is decreased, and the search accuracy is improved in the template matching based on the coarse-to-fine search method.

It is noted that, according to the third exemplary embodiment, the example in which the area of the figure surrounded by each of the contours is used as the size of each of the contours has been illustrated but is not limited to this. The area or the width and the height of the circumscribed rectangular (circumscribed figure) of each of the contours may be used as the reference for the size. Furthermore, the length of each the contours may be used as the reference for the size for each of the contours.

Accordingly, for example, even in a case where the area of the contour is not to be calculated such as a case where the contour does not have a closed shape, the size of the contour can be calculated.

The present invention is not limited to the above-described exemplary embodiments, and various modifications can be made within the technical concept of the present invention.

Specifically, the respective processing operations according to the above-described exemplary embodiments are executed by the CPU 101. Therefore, the operations may be achieved while a recording medium that records a program for realizing the above-described functions is supplied to the image processing apparatus 100, and a computer (a CPU or an MPU) constituting the image processing apparatus 100 reads out and executes the program stored in the recording medium. In this case, the program itself read out from the recording medium realizes the functions according to the above-described exemplary embodiments, and the program itself and the recording medium that records the program constitute the present invention.

In addition, according to the above-described exemplary embodiments, the case where a computer-readable recording medium is the HDD 104, and the program 120 is stored in the HDD 104 has been described, but the configuration is not limited to this. The program may be recorded in any recording medium as long as the recording medium is computer-readable. For example, the ROM 102 illustrated in FIG. 1, the recording disc 121, an external storage apparatus that is not illustrated in the drawing, or the like may be used as the recording medium that supplies the program. While descriptions will be given by way of specific examples, a flexible disc, a hard disc, an optical disc, an opto-magnetic disc, a CD-ROM, a CD-R, a magnetic tape, a non-volatile rewritable memory (for example, a USB memory), a ROM, or the like can be used as the recording medium.

In addition, the program according to the above-described exemplary embodiments may be downloaded via a network and executed by the computer.

Moreover, a configuration is not only limited to a case where program codes read out by the computer are executed to the functions according to the above-described exemplary embodiments. The present invention also includes a case where an operating system (OS) or the like running on the computer performs a part or all of actual processings on the basis of an instruction of the program code, and the functions according to the above-described exemplary embodiments are realized by the processing.

Furthermore, the program codes read out from the recording medium may be written into a memory provided to a function expansion board inserted to the computer or a function expansion unit connected to the computer. The present invention also includes a case where a CPU or the like provided to the function expansion board or the function expansion unit performs a part or all of the actual processings on the basis of an instruction of the program code, and the functions according to the above-described exemplary embodiments are realized by the processing.

In addition, according to the above-described exemplary embodiments, the case where the computer executes the program recorded in the recording medium such as the HDD to perform the processing has been described, but the configuration is not limited to this. A part or all of functions of a calculation unit that operates on the basis of the program may be constituted by a dedicated-use LSI such as an application specific integrated circuit (ASIC) or a field-programmable gate array (FPGA).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-140257, filed Jul. 8, 2014, which is hereby incorporated by reference herein in its entirety.

What is claimed is:

1. An image processing method, the method comprising:
a first process of generating a first pyramid by hierarchizing a plurality of template images having different resolutions from each other in an order of resolution;
a second process of generating a second pyramid by hierarchizing a plurality of search target images having different resolutions from each other corresponding to the same resolutions of the template images in the first pyramid in the order of resolution; and
a search process of performing search processing for searching for a feature image included in each of the template images in the first pyramid from the corresponding search target image of the same resolution in the second pyramid,
wherein the first process includes setting a number of stages of the first pyramid in a manner that a size of the feature image included in each of the template images in the first pyramid is not smaller than a previously set threshold,
wherein the first process includes generating a plurality of template image candidates having different resolutions from each other and setting a template image candidate of the plurality of template image candidates including a feature image having a size larger than or equal to the threshold as a template image constituting the first pyramid,
wherein the feature image included in the template image candidate includes a contour set constituted by one or more contours extracted from an original reference image, and
wherein the size of the feature image included in the template image candidate is a size of the contour set.

2. The image processing method according to claim 1, wherein the size of the contour set is an area of a part surrounded by the contour set.

3. The image processing method according to claim 1, wherein the size of the contour set is an area of a circumscribed figure that is circumscribed with the contour set.

4. The image processing method according to claim 1, wherein the size of the contour set is a total sum of each length of each contour included in the contour set.

5. The image processing method according to claim 1, wherein the size of the feature image included in the template image candidate is a size of a smallest contour among each contour included in the contour set.

6. The image processing method according to claim 5, wherein the size of the smallest contour is an area of a part surrounded by the smallest contour.

7. The image processing method according to claim 5, wherein the size of the smallest contour is an area of a circumscribed figure that is circumscribed with the smallest contour.

8. The image processing method according to claim 5, wherein the size of the smallest contour is a length of the smallest contour.

9. The image processing method according to claim 1, wherein the first process includes deleting a contour having a size smaller than or equal to the threshold among each contour included in the generated plurality of template image candidates and setting a template image candidate having at least one contour remaining as the template image constituting the first pyramid.

10. The image processing method according to claim 9, wherein the size of the contour is an area surrounding a part.

11. The image processing method according to claim 9, wherein the size of the contour is an area of a circumscribed figure.

12. The image processing method according to claim 9, wherein the size of the contour is a length.

13. An image processing apparatus that executes the respective processes of the image processing method according to claim 1.

14. A non-transitory computer-readable recording medium that records a program for causing a computer to execute the respective processes of the image processing method according to claim 1.

* * * * *